United States Patent
Beveridge et al.

(10) Patent No.: US 11,329,987 B2
(45) Date of Patent: May 10, 2022

(54) PROTECTING ENTERPRISE COMPUTING RESOURCES BY IMPLEMENTING AN OPTICAL AIR GAP SYSTEM

(71) Applicant: Bank of America Corporation, Charlotte, NC (US)

(72) Inventors: Michael Beveridge, Waxhaw, NC (US); Jeffrey K. Johnson, Cornelius, NC (US); George Albero, Charlotte, NC (US); Elizabeth R. Liuzzo, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 442 days.

(21) Appl. No.: 16/505,097

(22) Filed: Jul. 8, 2019

(65) Prior Publication Data

US 2021/0014229 A1    Jan. 14, 2021

(51) Int. Cl.
*H04L 29/00* (2006.01)
*H04L 29/06* (2006.01)
*G06V 30/40* (2022.01)
*G06V 30/10* (2022.01)

(52) U.S. Cl.
CPC .............. *H04L 63/10* (2013.01); *G06V 30/40* (2022.01); *H04L 63/123* (2013.01); *G06V 30/10* (2022.01)

(58) Field of Classification Search
CPC ............. H04L 63/1441; H04L 63/1416; H04L 63/1483; H04L 63/10; H04L 63/123; G06K 2209/01; G06K 9/00442; G06K 9/6262; G06V 30/40; G06V 30/10
See application file for complete search history.

(56) References Cited

U.S. PATENT DOCUMENTS

| | | |
|---|---|---|
| 6,772,345 B1 | 8/2004 | Shetty |
| 7,596,607 B2 | 9/2009 | Girouard et al. |
| 8,359,361 B2 | 1/2013 | Thornton et al. |
| 8,843,566 B2 | 9/2014 | Thompson |
| 9,177,293 B1 | 11/2015 | Gagnon et al. |
| 9,363,280 B1 * | 6/2016 | Rivlin ................. H04L 63/1433 |
| 9,548,968 B2 | 1/2017 | Cialdea et al. |
| 9,888,019 B1 | 2/2018 | Pidathala et al. |
| 9,906,539 B2 | 2/2018 | Higbee et al. |
| 9,977,901 B2 | 5/2018 | Eytan et al. |

(Continued)

*Primary Examiner* — Don G Zhao
(74) *Attorney, Agent, or Firm* — Banner & Witcoff, Ltd.

(57) ABSTRACT

Aspects of the disclosure relate to protecting enterprise computing resources by implementing an optical air gap system. A computing platform may receive, from an external communications server, a message. The computing platform then may generate an image representation of the message received from the external communications server. Subsequently, the computing platform may execute an optical character recognition (OCR) process on the image representation of the message, which may produce a recreated message. Then, the computing platform may validate contents of the recreated message. Based on validating the contents of the recreated message, the computing platform may send, to an enterprise communications server, the recreated message, and sending the recreated message to the enterprise communications server may cause the enterprise communications server to deliver the recreated message to at least one enterprise user computing device.

17 Claims, 9 Drawing Sheets

(56) References Cited

U.S. PATENT DOCUMENTS

| | | |
|---|---|---|
| 10,021,128 B2 | 7/2018 | McDougal |
| 10,073,579 B2 | 9/2018 | Thornton et al. |
| 10,127,621 B2 | 11/2018 | Cialdea et al. |
| 11,019,076 B1* | 5/2021 | Jakobsson ............... H04L 51/12 |
| 2004/0230657 A1* | 11/2004 | Tomkow ............... H04L 63/123 709/206 |
| 2007/0177823 A1* | 8/2007 | Tredoux ................. H04N 1/446 382/306 |
| 2007/0245147 A1* | 10/2007 | Okeya ................... H04L 9/0643 713/181 |
| 2008/0114983 A1* | 5/2008 | Sherkin ................ H04L 63/083 713/171 |
| 2008/0189770 A1* | 8/2008 | Sachtjen .................... H04L 9/12 726/4 |
| 2013/0145169 A1* | 6/2013 | Poovendran .......... H04L 9/3242 713/181 |
| 2014/0185793 A1* | 7/2014 | Wolrich ............. G06F 9/30145 380/28 |
| 2015/0180894 A1* | 6/2015 | Sadovsky ............... H04L 67/22 726/22 |
| 2016/0182532 A1* | 6/2016 | Jones .................. H04L 63/0428 726/30 |
| 2017/0221066 A1* | 8/2017 | Ledford ............... G06Q 20/407 |
| 2017/0228119 A1 | 8/2017 | Hosbettu et al. |
| 2017/0237723 A1 | 8/2017 | Gupta et al. |
| 2017/0255769 A1 | 9/2017 | Loughlin-McHugh et al. |
| 2017/0366355 A1* | 12/2017 | Alomair ................ H04L 9/0618 |
| 2017/0372227 A1 | 12/2017 | Hosabettu et al. |
| 2017/0374502 A1 | 12/2017 | Gabel |
| 2018/0025334 A1* | 1/2018 | Pourfallah ............. G06Q 20/02 705/4 |
| 2018/0025563 A1 | 1/2018 | Kerning et al. |
| 2018/0033110 A1 | 2/2018 | Sanchez |
| 2018/0039971 A1 | 2/2018 | Mansur |
| 2018/0089419 A1* | 3/2018 | Loughlin-McHugh ...................... G06F 21/45 |
| 2018/0107576 A1 | 4/2018 | Walden et al. |
| 2018/0107955 A1 | 4/2018 | Walden et al. |
| 2018/0108043 A1 | 4/2018 | Walden et al. |
| 2018/0108044 A1 | 4/2018 | Walden et al. |
| 2018/0109338 A1 | 4/2018 | Walden et al. |
| 2018/0109762 A1 | 4/2018 | Aich et al. |
| 2018/0109913 A1 | 4/2018 | Walden et al. |
| 2018/0109928 A1 | 4/2018 | Walden et al. |
| 2018/0165781 A1* | 6/2018 | Rodriguez .............. H04L 63/08 |
| 2018/0173906 A1 | 6/2018 | Rodriguez et al. |
| 2018/0176017 A1* | 6/2018 | Rodriguez .......... H04L 63/0861 |
| 2018/0181964 A1* | 6/2018 | Zagarese .......... G06Q 20/40145 |
| 2018/0204111 A1 | 7/2018 | Zadeh et al. |
| 2018/0205815 A1 | 7/2018 | Woloshyn |
| 2018/0239507 A1 | 8/2018 | Bui et al. |
| 2018/0239959 A1 | 8/2018 | Bui et al. |
| 2018/0253409 A1 | 9/2018 | Carlson et al. |
| 2018/0261025 A1 | 9/2018 | Kerning et al. |
| 2018/0267949 A1 | 9/2018 | Wilczek et al. |
| 2018/0300704 A1 | 10/2018 | White |
| 2018/0302417 A1 | 10/2018 | Wilson |
| 2018/0315066 A1 | 11/2018 | Heitmueller et al. |
| 2018/0349892 A1 | 12/2018 | Lattanzio et al. |
| 2018/0357385 A1 | 12/2018 | LaPorte et al. |
| 2018/0367506 A1 | 12/2018 | Ford et al. |
| 2018/0374039 A1 | 12/2018 | Walden et al. |
| 2018/0374069 A1 | 12/2018 | Frankel |
| 2018/0374127 A1 | 12/2018 | Walden et al. |
| 2019/0011283 A1 | 1/2019 | Soutar et al. |
| 2019/0034456 A1 | 1/2019 | Macciola et al. |
| 2019/0034921 A1 | 1/2019 | Hammad et al. |
| 2019/0037354 A1 | 1/2019 | Johnson |
| 2019/0057216 A1 | 2/2019 | Gaudet et al. |
| 2019/0080307 A1 | 3/2019 | Katzin et al. |
| 2019/0080325 A1* | 3/2019 | Pourfallah ........... G06Q 20/326 |
| 2019/0108509 A1 | 4/2019 | Hammad |
| 2019/0108701 A1 | 4/2019 | Kerning et al. |
| 2019/0114589 A1 | 4/2019 | Voss et al. |
| 2019/0147558 A1 | 5/2019 | Cheikh et al. |
| 2019/0171620 A1 | 6/2019 | McCollum et al. |
| 2019/0199745 A1* | 6/2019 | Jakobsson ........... H04L 63/1433 |

* cited by examiner

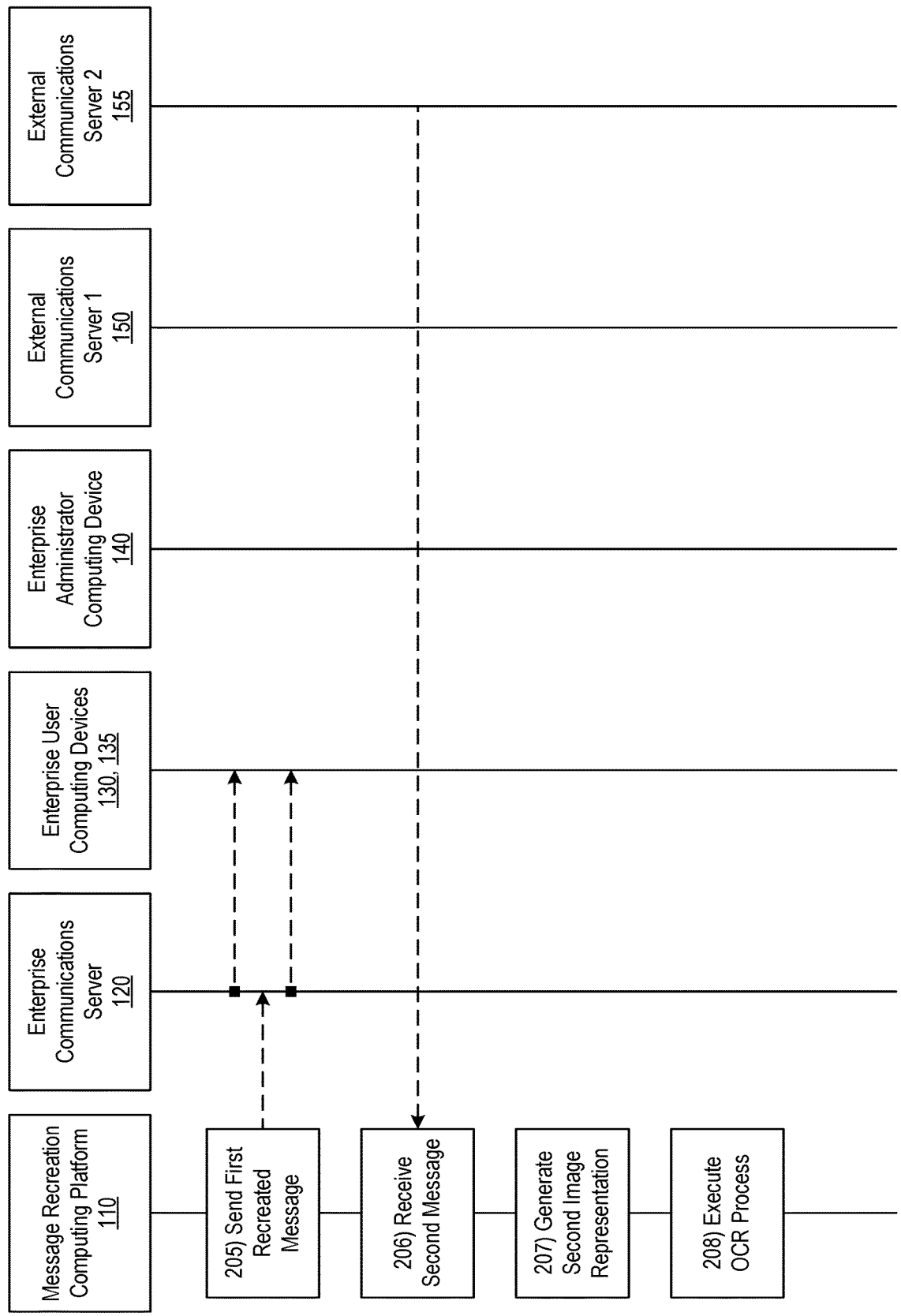

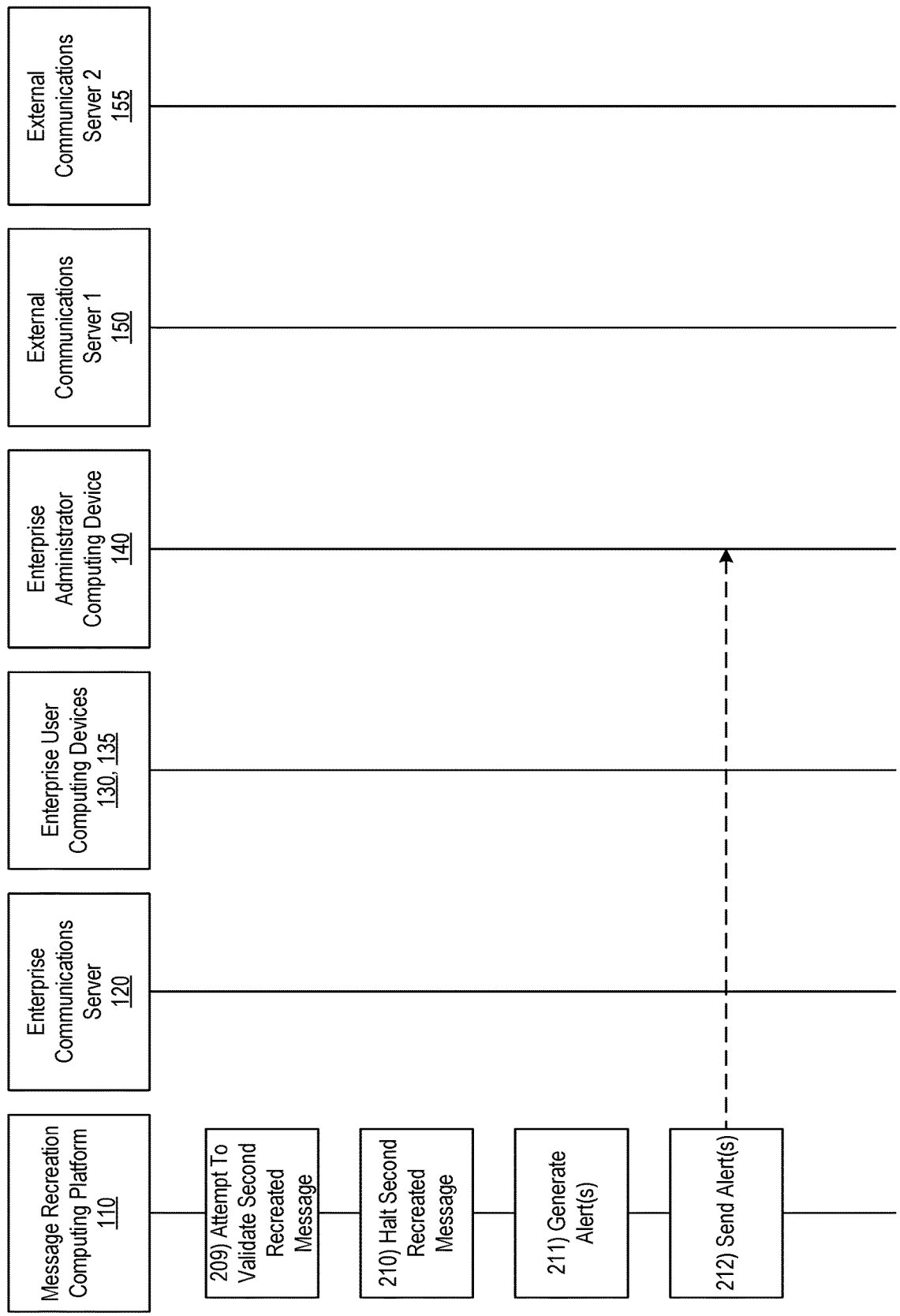

us 11,329,987 B2

PROTECTING ENTERPRISE COMPUTING RESOURCES BY IMPLEMENTING AN OPTICAL AIR GAP SYSTEM

BACKGROUND

Aspects of the disclosure relate to deploying digital data processing systems, providing information security, and preventing unauthorized access to resources of an information system. In particular, one or more aspects of the disclosure relate to protecting enterprise computing resources by implementing an optical air gap system.

Enterprise organizations may utilize various computing infrastructure to maintain confidential information and/or other sensitive data that is created and/or used for various purposes. Ensuring that this data is secure and only accessible to appropriate users for appropriate purposes may be critically important to protecting the integrity and confidentiality of the underlying information. Enterprise computer systems, however, might need to interface with external systems to support various legitimate functions, such as exchanging email messages and facilitating other data transfers with external systems. In many instances, it may be difficult to ensure and enhance data security on enterprise computer systems while providing interfaces with external systems, particularly when also attempting to optimize the resource utilization, bandwidth utilization, and efficient operations of the enterprise computing infrastructure.

SUMMARY

Aspects of the disclosure provide effective, efficient, scalable, and convenient technical solutions that address and overcome the technical problems associated with ensuring information security and preventing unauthorized access to resources of enterprise computer systems by implementing an optical air gap system.

In accordance with one or more embodiments, a computing platform having at least one processor, a communication interface, and memory may receive, via the communication interface, from a first external communications server, a first message. Based on receiving the first message from the first external communications server, the computing platform may generate a first image representation of the first message received from the first external communications server. Subsequently, the computing platform may execute an optical character recognition (OCR) process on the first image representation of the first message, and executing the OCR process on the first image representation of the first message may produce a first recreated message. Then, the computing platform may validate contents of the first recreated message. Based on validating the contents of the first recreated message, the computing platform may send, via the communication interface, to an enterprise communications server, the first recreated message. In addition, sending the first recreated message to the enterprise communications server may cause the enterprise communications server to deliver the first recreated message to at least one enterprise user computing device.

In some embodiments, validating the contents of the first recreated message may include evaluating text content of the first recreated message, one or more links associated with the first recreated message, or one or more attachments associated with the first recreated message.

In some embodiments, the enterprise communications server and the at least one enterprise user computing device may be connected to an enterprise network. The first external communications server may be connected to a public network different from the enterprise network. In addition, the computing platform may include a first communications node for communicating with the enterprise network and a second communications node for communicating with the public network.

In some embodiments, validating the contents of the first recreated message may include validating the contents of the first recreated message in near real-time as the first message is received from the first external communications server.

In some embodiments, the computing platform may receive, via the communication interface, from a second external communications server, a second message. Based on receiving the second message from the second external communications server, the computing platform may generate a second image representation of the second message received from the second external communications server. Subsequently, the computing platform may execute the OCR process on the second image representation of the second message, and executing the OCR process on the second image representation of the second message may produce a second recreated message. Then, the computing platform may attempt to validate contents of the second recreated message, and in attempting to validate the contents of the second recreated message, the computing platform may fail to validate the contents of the second recreated message. Based on failing to validate the contents of the second recreated message, the computing platform may halt the second recreated message.

In some embodiments, attempting to validate the contents of the second recreated message may include identifying that text content of the second recreated message is invalid. In some embodiments, attempting to validate the contents of the second recreated message may include identifying that at least one link associated with the second recreated message is invalid. In some embodiments, attempting to validate the contents of the second recreated message may include identifying that at least one attachment associated with the second recreated message is invalid.

In some embodiments, in response to failing to validate the contents of the second recreated message, the computing platform may generate at least one alert message comprising information indicating that the second recreated message failed validation. Subsequently, the computing platform may send, via the communication interface, to an enterprise administrator computing device, the at least one alert message comprising the information indicating that the second recreated message failed validation.

In some embodiments, in response to failing to validate the contents of the second recreated message, the computing platform may update at least one data record maintained by the computing platform to flag a sender of the second message received from the second external communications server as suspicious.

In some embodiments, the computing platform may receive, via the communication interface, from the enterprise communications server, a third message. Based on receiving the third message from the enterprise communications server, the computing platform may generate a third image representation of the third message received from the enterprise communications server. Subsequently, the computing platform may execute the OCR process on the third image representation of the third message, and executing the OCR process on the third image representation of the third message may produce a third recreated message. Then, the computing platform may validate contents of the third recreated message. Based on validating the contents of the third recreated message, the computing platform may send, via the communication interface, to one or more external communications servers, the third recreated message. In addition, sending the third recreated message to the one or more external communications servers may cause the one or more external communications servers to deliver the third recreated message to at least one external user computing device.

In some embodiments, validating the contents of the third recreated message may include evaluating text content of the third recreated message, one or more links associated with the third recreated message, or one or more attachments associated with the third recreated message.

In some embodiments, generating the third image representation of the third message received from the enterprise communications server may include masking user account information included in the third message received from the enterprise communications server.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for protecting enterprise computing resources by implementing an optical air gap system in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
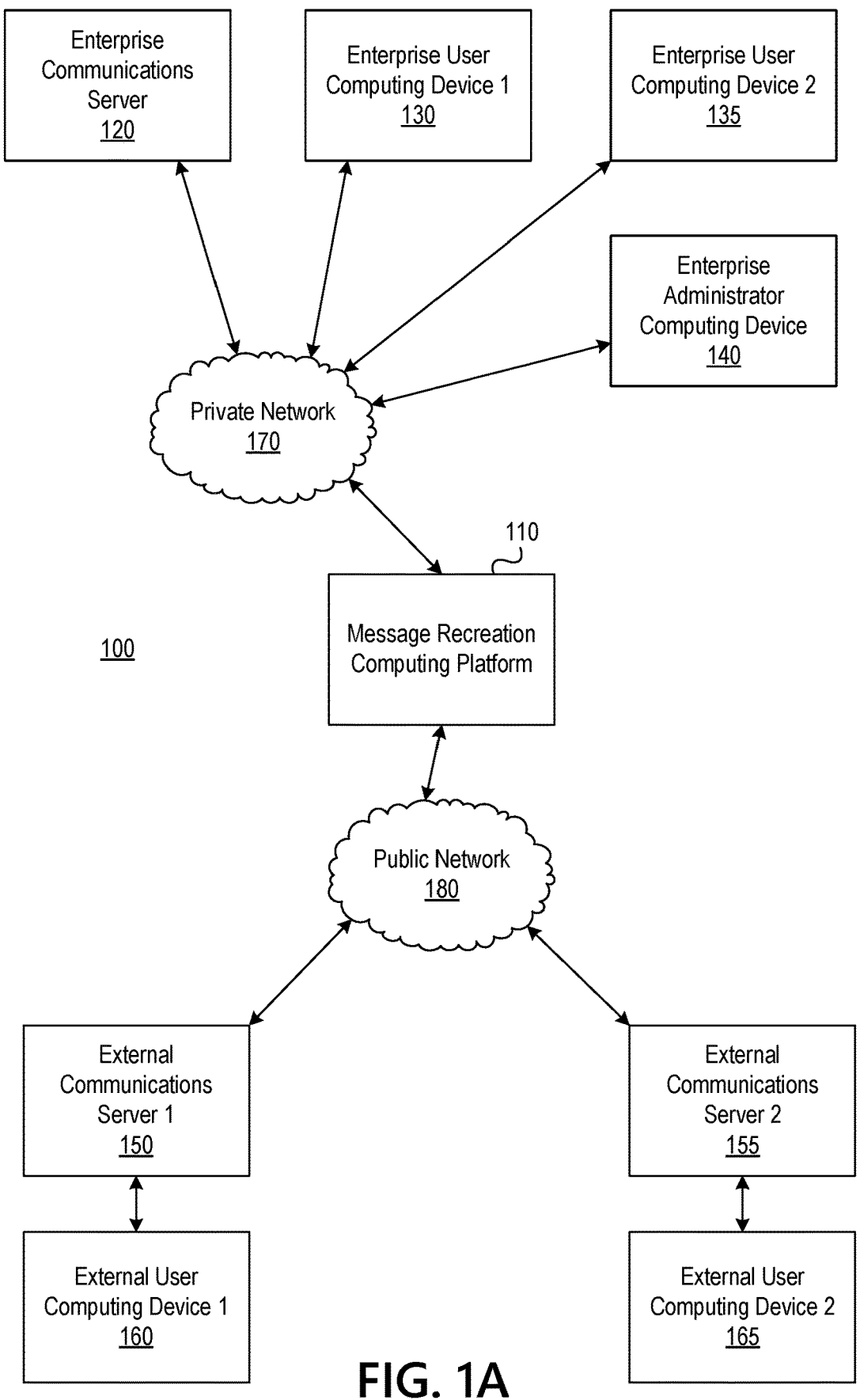
FIGS. 1A and 1B depict an illustrative computing environment for protecting enterprise computing resources by implementing an optical air gap system in accordance with one or more example embodiments.
Figure 1B:
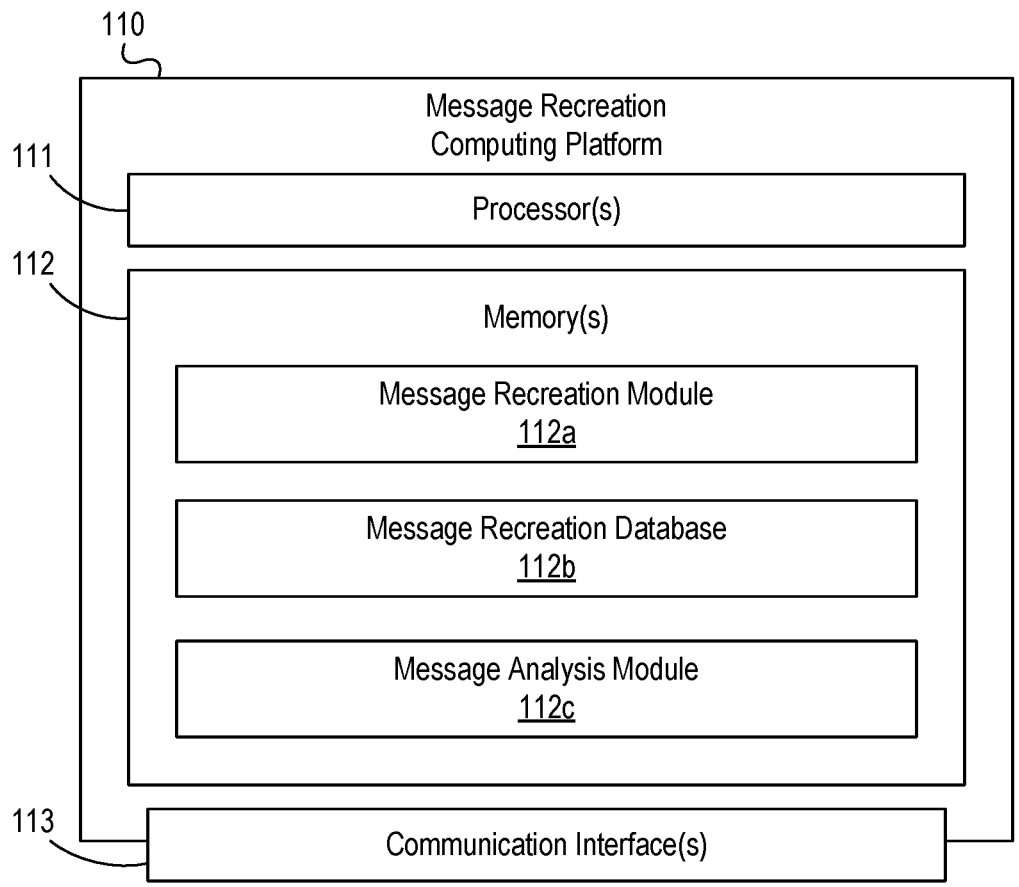

FIGS. 1A and 1B depict an illustrative computing environment for protecting enterprise computing resources by implementing an optical air gap system in accordance with one or more example embodiments. Referring to FIG. 1A, computing environment 100 may include one or more computer systems. For example, computing environment 100 may include a message recreation computing platform 110, an enterprise communications server 120, a first enterprise user computing device 130, a second enterprise user computing device 135, an enterprise administrator computing device 140, a first external communications server 150, a second external communications server 155, a first external user computing device 160, and a second external user computing device 165.

As illustrated in greater detail below, message recreation computing platform 110 may include one or more computing devices configured to perform one or more of the functions described herein. For example, message recreation computing platform 110 may include one or more computers (e.g., laptop computers, desktop computers, servers, server blades, or the like).

Enterprise communications server 120 may include one or more computing devices and/or other computer components (e.g., processors, memories, communication interfaces). In addition, and as illustrated in greater detail below, enterprise communications server 120 may be configured to receive, store, deliver, and/or otherwise process one or more electronic communications (e.g., email messages, instant messages, and/or the like) associated with an enterprise organization, such as a financial institution. In some instances, enterprise communications server 120 may be configured to interface with various enterprise and/or back-office computer systems of an enterprise organization, such as a financial institution. For example, enterprise communications server 120 may interface with and/or otherwise communicate with various servers and/or databases that store and/or otherwise maintain account information, such as financial account information including account balances, transaction history, account owner information, and/or other information.

Enterprise user computing device 130 may be a personal computing device (e.g., desktop computer, laptop computer) or mobile computing device (e.g., smartphone, tablet). In addition, enterprise user computing device 130 may be linked to and/or used by a first enterprise user (who may, e.g., be an employee or other affiliate of an enterprise organization operating message recreation computing platform 110). Enterprise user computing device 135 may be a personal computing device (e.g., desktop computer, laptop computer) or mobile computing device (e.g., smartphone, tablet). In addition, enterprise user computing device 135 may be linked to and/or used by a second enterprise user (who may, e.g., be an employee or other affiliate of an enterprise organization operating message recreation computing platform 110) different from the first enterprise user.

Enterprise administrator computing device 140 may be a personal computing device (e.g., desktop computer, laptop computer) or mobile computing device (e.g., smartphone, tablet). In addition, enterprise administrator computing device 140 may be linked to and/or used by an administrative user (who may, e.g., be a network administrator of an enterprise organization operating message recreation computing platform 110).

External communications server 150 may include one or more computing devices and/or other computer components (e.g., processors, memories, communication interfaces). In addition, external communications server 150 may be configured to receive, store, deliver, and/or otherwise process one or more electronic communications (e.g., email messages, instant messages, and/or the like) associated with a first external organization (e.g., an organization different from the enterprise organization operating message recreation computing platform 110). External communications server 155 may include one or more computing devices and/or other computer components (e.g., processors, memories, communication interfaces). In addition, external communications server 155 may be configured to receive, store, deliver, and/or otherwise process one or more electronic communications (e.g., email messages, instant messages, and/or the like) associated with a second external organization (e.g., an organization different from the enterprise organization operating message recreation computing platform 110) different from the first external organization.

External user computing device 160 may be a personal computing device (e.g., desktop computer, laptop computer) or mobile computing device (e.g., smartphone, tablet). In addition, external user computing device 160 may be linked to and/or used by a first external user (who may, e.g., be external to and/or unaffiliated with an enterprise organization operating message recreation computing platform 110). External user computing device 165 may be a personal computing device (e.g., desktop computer, laptop computer) or mobile computing device (e.g., smartphone, tablet). In addition, external user computing device 165 may be linked to and/or used by a second external user (who may, e.g., be external to and/or unaffiliated with an enterprise organization operating message recreation computing platform 110) different from the first external user.

Computing environment 100 also may include one or more networks, which may interconnect one or more of message recreation computing platform 110, enterprise communications server 120, enterprise user computing device 130, enterprise user computing device 135, enterprise administrator computing device 140, external communications server 150, external communications server 155, external user computing device 160, and external user computing device 165. For example, computing environment 100 may include a private network 170 (which may, e.g., interconnect message recreation computing platform 110, enterprise communications server 120, enterprise user computing device 130, enterprise user computing device 135, enterprise administrator computing device 140, and/or one or more other systems which may be associated with an organization, such as a financial institution) and public network 180 (which may, e.g., interconnect external communications server 150, external communications server 155, external user computing device 160, and external user computing device 165 with message recreation computing platform 110 and/or one or more other systems, public networks, sub-networks, and/or the like).

In one or more arrangements, enterprise communications server 120, enterprise user computing device 130, enterprise user computing device 135, enterprise administrator computing device 140, external communications server 150, external communications server 155, external user computing device 160, external user computing device 165, and/or the other systems included in computing environment 100 may be any type of computing device capable of receiving a user interface, receiving input via the user interface, and communicating the received input to one or more other computing devices. For example, enterprise communications server 120, enterprise user computing device 130, enterprise user computing device 135, enterprise administrator computing device 140, external communications server 150, external communications server 155, external user computing device 160, external user computing device 165, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of message recreation computing platform 110, enterprise communications server 120, enterprise user computing device 130, enterprise user computing device 135, enterprise administrator computing device 140, external communications server 150, external communications server 155, external user computing device 160, and external user computing device 165 may, in some instances, be special-purpose computing devices configured to perform specific functions.

Referring to FIG. 1B, message recreation computing platform 110 may include one or more processors 111, memory 112, and communication interface 113. A data bus may interconnect processor 111, memory 112, and communication interface 113. Communication interface 113 may be a network interface configured to support communication between message recreation computing platform 110 and one or more networks (e.g., network 170, network 180, or the like). Memory 112 may include one or more program modules having instructions that when executed by processor 111 cause message recreation computing platform 110 to perform one or more functions described herein and/or one or more databases that may store and/or otherwise maintain information which may be used by such program modules and/or processor 111. In some instances, message recreation computing platform 110 may be made up of multiple computer server devices operating in parallel (e.g., to process inbound communications and outbound communications associated with an enterprise organization in near real-time), and each computer server device of the multiple computer server devices may include one or more processors, memories, communication interfaces, and/or other components. In some instances, the one or more program modules and/or databases may be stored by and/or maintained in different memory units of message recreation computing platform 110 and/or by different computing devices that may form and/or otherwise make up message recreation computing platform 110. For example, memory 112 may have, store, and/or include a message recreation module 112*a*, a message recreation database 112*b*, and a message analysis module 112*c*. Message recreation module 112*a* may have instructions that direct and/or cause message recreation computing platform 110 to protect enterprise computing resources by implementing an optical air gap system, as discussed in greater detail below. Message recreation database 112*b* may store information used by message recreation module 112*a* and/or message recreation computing platform 110 in protecting enterprise computing resources by implementing an optical air gap system. Message analysis module 112*c* may analyze one or more aspects of one or more inbound messages and/or outbound messages (e.g., in validating and/or attempting to validate such messages, as discussed in greater detail below).

Figure 2A:
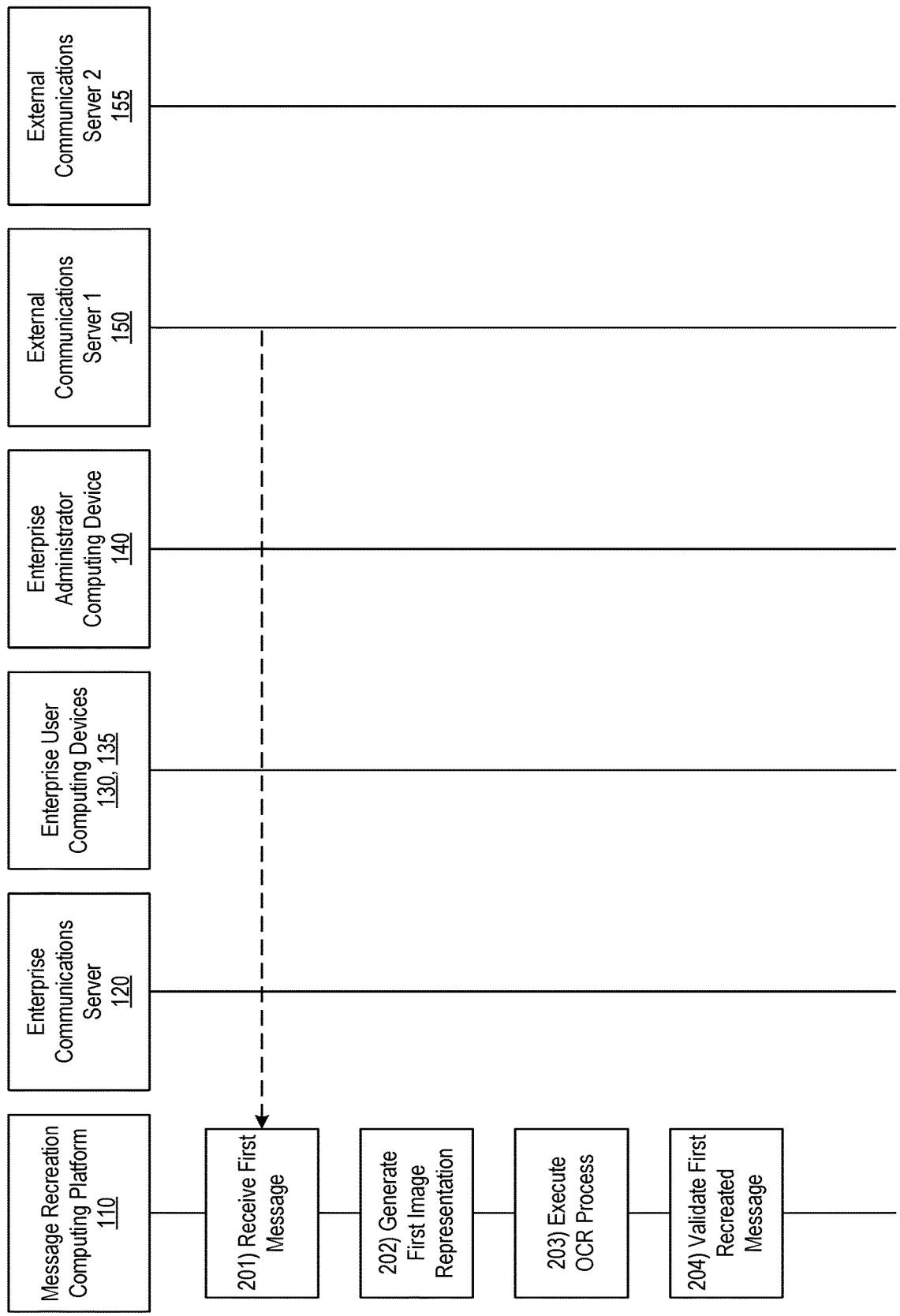

FIGS. 2A-2E depict an illustrative event sequence for protecting enterprise computing resources by implementing an optical air gap system in accordance with one or more example embodiments. Referring to FIG. 2A, at step 201, message recreation computing platform 110 may receive a first message from external communications server 150. For example, at step 201, message recreation computing platform 110 may receive, via the communication interface (e.g., communication interface 113), from a first external communications server (e.g., external communications server 150), a first message. For instance, the first message received by message recreation computing platform 110 from external communications server 150 may be an inbound message (e.g., an inbound email message) from an external sender that is addressed to one or more enterprise users and/or enterprise devices.

At step 202, message recreation computing platform 110 may generate an image representation of the first message. For example, at step 202, based on receiving the first message from the first external communications server (e.g., external communications server 150), message recreation computing platform 110 may generate a first image representation of the first message received from the first external communications server (e.g., external communications server 150). For instance, in generating the first image representation of the first message received from external communications server 150, message recreation computing platform 110 may print and/or otherwise output the message body (e.g., message text, images, and/or other content) of the first message into an image file (which may, e.g., be generated and/or stored in a bitmap format, PNG format, or other graphics format). In generating this image file, message recreation computing platform 110 may, for instance, flatten text, images, and/or other layered content in the message body into a single layer of pixels that are represented only as graphical data (e.g., pixels) in the image file.

At step 203, message recreation computing platform 110 may execute an OCR process (e.g., on the image representation of the first message, to convert alphanumeric characters in the image representation from graphical data back into text data). For example, at step 203, message recreation computing platform 110 may execute an optical character recognition (OCR) process on the first image representation of the first message. In addition, by executing the OCR process on the first image representation of the first message, message recreation computing platform 110 may produce a first recreated message. For instance, in executing the OCR process on the first image representation of the first message, message recreation computing platform 110 may apply an image-to-text algorithm to the image representation, so as to convert graphical content in the image representation back into machine-readable text content, thereby re-creating a clean version of the original message (which may, e.g., be free of any embedded content that might have been included in the original version of the message).

At step 204, message recreation computing platform 110 may validate the recreated message. For example, at step 204, message recreation computing platform 110 may validate contents of the first recreated message. For instance, in validating the contents of the first recreated message at step 204, message recreation computing platform 110 may determine that the message is clean (e.g., because message recreation computing platform 110 may scan the message and determine that the message does not contain viruses, other malware, suspicious links, harmful content, or the like) and therefore determine that the message is valid.

In some embodiments, validating the contents of the first recreated message may include evaluating text content of the first recreated message, one or more links associated with the first recreated message, or one or more attachments associated with the first recreated message. For example, in validating the contents of the first recreated message, message recreation computing platform 110 may evaluate text content of the first recreated message, one or more links associated with the first recreated message, or one or more attachments associated with the first recreated message. For instance, in validating the contents of the first recreated message, message recreation computing platform 110 may analyze message text of the first recreated message to scan for text associated with harmful content (e.g., phishing scams or the like). Additionally or alternatively, in validating the contents of the first recreated message, message recreation computing platform 110 may open links included in the first recreated message and scan pages corresponding to such links to determine whether such pages include harmful content, malware, or the like. Additionally or alternatively, in validating the contents of the first recreated message, message recreation computing platform 110 may analyze attachments to the message (e.g., attached files, macros, or the like) to scan for viruses or other malware.

Referring to FIG. 2B, at step 205, message recreation computing platform 110 may send the recreated message to enterprise communications server 120. For example, at step 205, based on validating the contents of the first recreated message, message recreation computing platform 110 may send, via the communication interface (e.g., communication interface 113), to an enterprise communications server (e.g., enterprise communications server 120), the first recreated message. In addition, by sending the first recreated message to the enterprise communications server (e.g., enterprise communications server 120), message recreation computing platform 110 may cause the enterprise communications server (e.g., enterprise communications server 120) to deliver the first recreated message to at least one enterprise user computing device (e.g., enterprise user computing device 130, enterprise user computing device 135).

In some embodiments, the enterprise communications server and the at least one enterprise user computing device may be connected to an enterprise network. In addition, the first external communications server may be connected to a public network different from the enterprise network. Additionally, the computing platform may include a first communications node for communicating with the enterprise network and a second communications node for communicating with the public network. For example, the enterprise communications server (e.g., enterprise communications server 120) and the at least one enterprise user computing device (e.g., enterprise user computing device 130, enterprise user computing device 135) may be connected to an enterprise network (e.g., private network 170). In addition, the first external communications server (e.g., external communications server 150) may be connected to a public network (e.g., public network 180) different from the enterprise network (e.g., private network 170). Additionally, the computing platform (e.g., message recreation computing platform 110) may include a first communications node for communicating with the enterprise network (e.g., private network 170) and a second communications node for communicating with the public network (e.g., public network 180). In this way, message recreation computing platform 110 may operate at a junction point of the enterprise network (e.g., private network 170) and the public network (e.g., public network 180), while maintaining and/or providing an air gap between the enterprise network (e.g., private network 170) and the public network (e.g., public network 180) to keep communications and/or other data associated with each network separate and/or isolated from communications and/or other data associated with the other network.

In some embodiments, validating the contents of the first recreated message may include validating the contents of the first recreated message in near real-time as the first message is received from the first external communications server. For example, in validating the contents of the first recreated message at step 204, message recreation computing platform 110 may validate the contents of the first recreated message in near real-time as the first message is received (e.g., by message recreation computing platform 110) from the first external communications server (e.g., external communications server 150). For instance, the generation of the image representation (e.g., at step 202), execution of the OCR process (e.g., at step 203), and validation of the recreated message (e.g., at step 204) may be performed by message recreation computing platform 110 in near real-time as the message is received, such that message recreation computing platform 110 may analyze the original message and pass along the recreated message (e.g., to enterprise communications server 120) as quickly as possible. In this way, message recreation computing platform 110 may efficiently, yet securely, protect internal enterprise resources from external threats, since external emails and other communications might never be allowed to enter the protected, enterprise network space, because only replications (which may, e.g., be generated and validated by message recreation computing platform 110, as illustrated above) of such emails and other communications may be allowed to reach enterprise communications server 120 and/or otherwise enter the protected, enterprise network space.

In some instances, message recreation computing platform 110 may detect groups of invalid messages associated with campaigns of harmful and/or otherwise malicious communications. In these instances, message recreation computing platform 110 may generate and send alerts to one or more internal enterprise systems (e.g., enterprise administrator computing device 140) and/or network administrators. Additionally or alternatively, message recreation computing platform 110 may similar monitor inbound data feeds (e.g., RSS data feeds) similar to how message recreation computing platform 110 may monitor other inbound communications (e.g., email messages).

At step 206, message recreation computing platform 110 may receive a second message from external communications server 155. For example, at step 206, message recreation computing platform 110 may receive, via the communication interface (e.g., communication interface 113), from a second external communications server (e.g., external communications server 155), a second message. For instance, the second message received by message recreation computing platform 110 from external communications server 155 may be an inbound message (e.g., an inbound email message) from an external sender that is addressed to one or more enterprise users and/or enterprise devices, similar to the first message.

At step 207, message recreation computing platform 110 may generate an image representation of the second message. For example, at step 207, based on receiving the second message from the second external communications server (e.g., external communications server 155), message recreation computing platform 110 may generate a second image representation of the second message received from the second external communications server (e.g., external communications server 155). For instance, in generating the second image representation of the second message received from external communications server 155, message recreation computing platform 110 may print and/or otherwise output the message body (e.g., message text, images, and/or other content) of the second message into an image file (which may, e.g., be generated and/or stored in a bitmap format, PNG format, or other graphics format). In generating this image file, message recreation computing platform 110 may, for instance, flatten text, images, and/or other layered content in the message body into a single layer of pixels that are represented only as graphical data (e.g., pixels) in the image file.

At step 208, message recreation computing platform 110 may execute an OCR process (e.g., on the image representation of the second message, to convert alphanumeric characters in the image representation from graphical data back into text data). For example, at step 208, message recreation computing platform 110 may execute the OCR process on the second image representation of the second message. In addition, by executing the OCR process on the second image representation of the second message, message recreation computing platform 110 may produce a second recreated message. For instance, in executing the OCR process on the second image representation of the second message, message recreation computing platform 110 may apply an image-to-text algorithm to the image representation, so as to convert graphical content in the image representation back into machine-readable text content, thereby re-creating a clean version of the original message (which may, e.g., be free of any embedded content that might have been included in the original version of the message).

Referring to FIG. 2C, at step 209, message recreation computing platform 110 may attempt to validate the recreated message. For example, at step 209, message recreation computing platform 110 may attempt to validate contents of the second recreated message. In addition, in attempting to validate the contents of the second recreated message, message recreation computing platform 110 may fail to validate the contents of the second recreated message. For instance, in attempting to validate the contents of the second recreated message at step 209, message recreation computing platform 110 might not determine that the message is clean (e.g., because message recreation computing platform 110 may scan the message and determine that the message does contain viruses, other malware, suspicious links, harmful content, or the like) and therefore may determine that the message is invalid.

In some embodiments, attempting to validate the contents of the second recreated message may include identifying that text content of the second recreated message is invalid. For example, in attempting to validate the contents of the second recreated message at step 209, message recreation computing platform 110 may identify that text content of the second recreated message is invalid. For instance, message recreation computing platform 110 may identify that text content of the second recreated message is invalid based on detecting that the text content of the second recreated message includes phishing content, keywords associated with scams, and/or other malicious content.

In some embodiments, attempting to validate the contents of the second recreated message may include identifying that at least one link associated with the second recreated message is invalid. For example, in attempting to validate the contents of the second recreated message at step 209, message recreation computing platform 110 may identify that at least one link associated with the second recreated message is invalid. For instance, message recreation computing platform 110 may identify that at least one link associated with the second recreated message is invalid based opening a page corresponding to the link, scanning the page, and determining that the page does not open or that the page contains phishing content, keywords associated with scams, and/or other malicious content.

In some embodiments, attempting to validate the contents of the second recreated message may include identifying that at least one attachment associated with the second recreated message is invalid. For example, in attempting to validate the contents of the second recreated message at step 209, message recreation computing platform 110 may identify that at least one attachment associated with the second recreated message is invalid. For instance, message recreation computing platform 110 may identify that at least one attachment associated with the second recreated message is invalid based on scanning the attachment and determining that the attachment contains virus code and/or other malware content.

At step 210, message recreation computing platform 110 may halt the second recreated message. For example, at step 210, based on failing to validate the contents of the second recreated message, message recreation computing platform 110 may halt the second recreated message. By halting the second recreated message, message recreation computing platform 110 may, for instance, prevent delivery of the second recreated message (e.g., to enterprise user computing device 130, enterprise user computing device 135, or the like) and/or may prevent the second recreated message (as well as the second message itself) from entering the protected enterprise network space (e.g., private network 170).

At step 211, message recreation computing platform 110 may generate one or more alerts. For example, at step 211, in response to failing to validate the contents of the second recreated message, message recreation computing platform 110 may generate at least one alert message comprising information indicating that the second recreated message failed validation. For instance, message recreation computing platform 110 may generate at least one alert message comprising information indicating that the second recreated message failed validation because the second recreated message contains viruses, other malware, suspicious links, harmful content, or the like.

Figure 3:
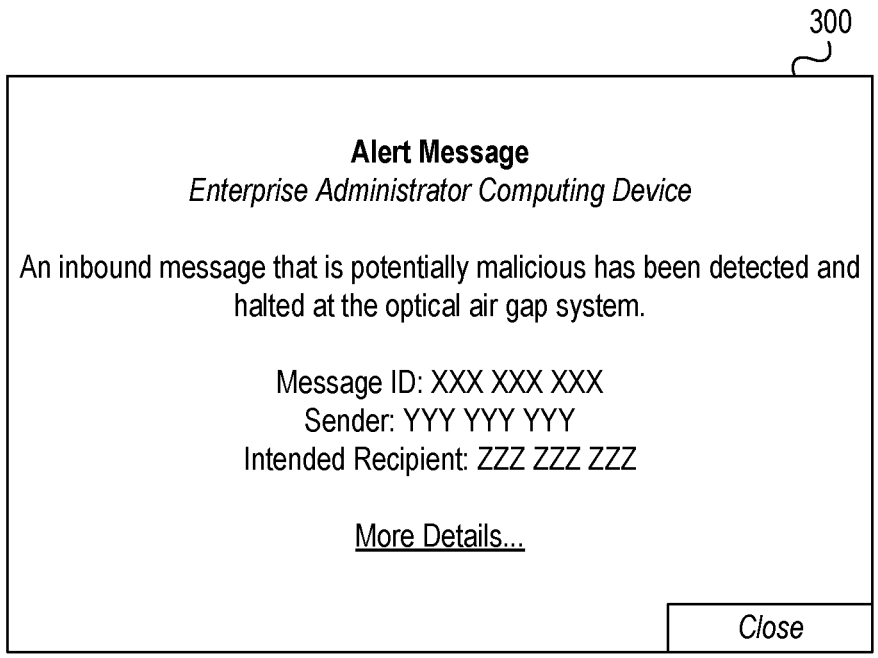
FIGS. 3 and 4 depict example graphical user interfaces for protecting enterprise computing resources by implementing an optical air gap system in accordance with one or more example embodiments.

At step 212, message recreation computing platform 110 may send the one or more alerts (e.g., to one or more administrator systems and/or devices, which may, e.g., be used by teams and/or individuals responsible for monitoring enterprise communications and protecting users from viruses, malware, suspicious links, harmful content, or the like). For example, at step 212, message recreation computing platform 110 may send, via the communication interface (e.g., communication interface 113), to an enterprise administrator computing device (e.g., enterprise administrator computing device 140), the at least one alert message comprising the information indicating that the second recreated message failed validation. In some instances, by sending the at least one alert message comprising the information indicating that the second recreated message failed validation to enterprise administrator computing device 140, message recreation computing platform 110 may cause enterprise administrator computing device 140 to display and/or otherwise present one or more graphical user interfaces similar to graphical user interface 300, which is illustrated in FIG. 3. As seen in FIG. 3, graphical user interface 300 may include text and/or other content indicating that a potentially malicious inbound message has been detected and halted (e.g., "An inbound message that is potentially malicious has been detected and halted at the optical air gap system. Message ID: XXX XXX XXX; Sender: YYY YYY YYY; Intended Recipient: ZZZ ZZZ ZZZ; More Details . . . ").

Figure 2D:
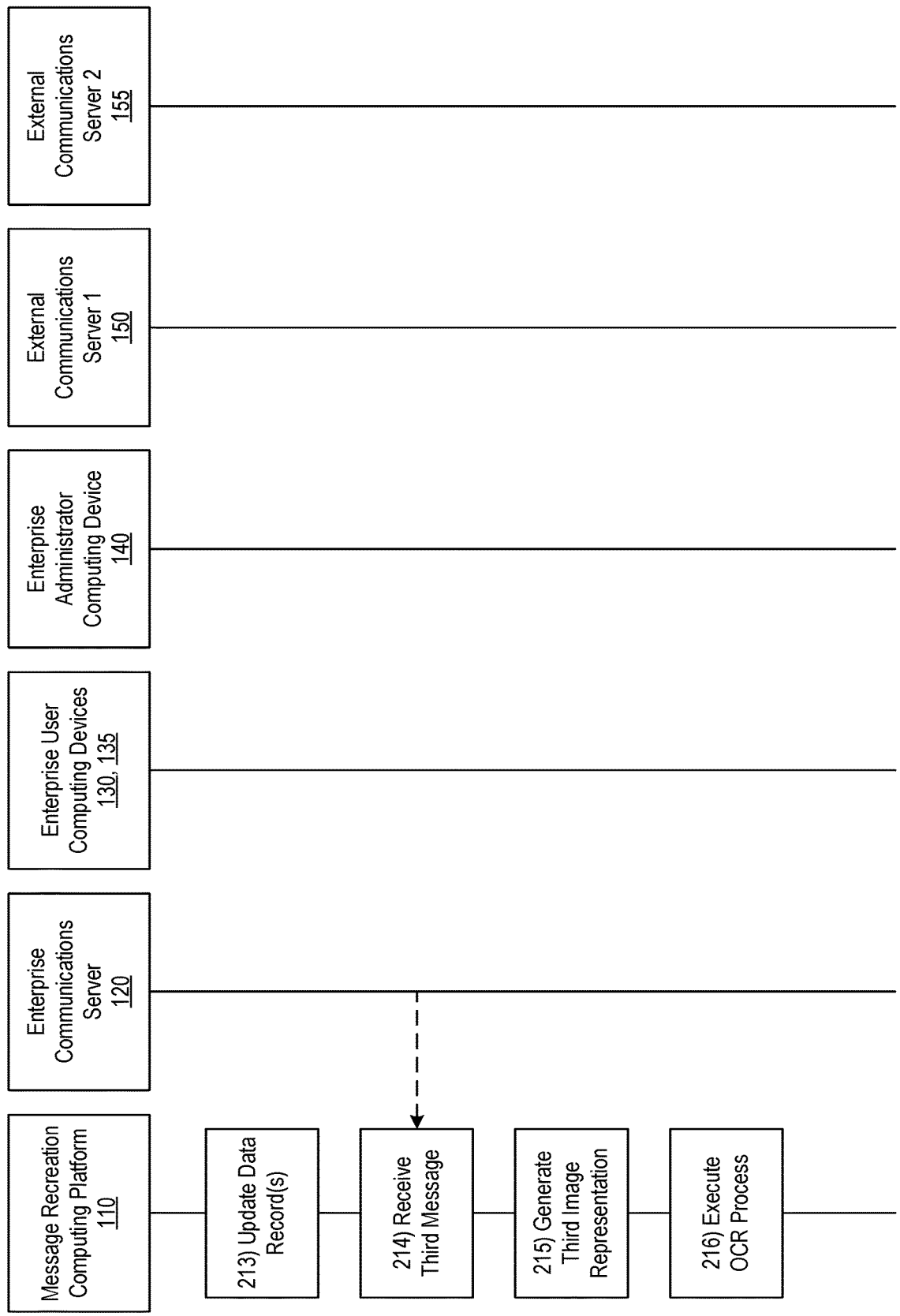

Referring to FIG. 2D, at step 213, message recreation computing platform 110 may update one or more data records. For example, at step 213, in response to failing to validate the contents of the second recreated message, message recreation computing platform 110 may update at least one data record maintained by the computing platform (e.g., message recreation computing platform 110) to flag a sender of the second message received from the second external communications server (e.g., external communications server 155) as suspicious. By flagging the sender of the second message received from the second external communications server (e.g., external communications server 155) as suspicious, message recreation computing platform 110 may subsequently block future messages received from the sender of the second message received from the second external communications server (e.g., external communications server 155) and/or may subject other messages received from the second external communications server (e.g., external communications server 155) to heightened scrutiny.

At step 214, message recreation computing platform 110 may receive a third message from enterprise communications server 120. For example, at step 214, message recreation computing platform 110 may receive, via the communication interface (e.g., communication interface 113), from the enterprise communications server (e.g., enterprise communications server 120), a third message. For instance, the third message received by message recreation computing platform 110 from enterprise communications server 120 may be an outbound message (e.g., an outbound email message) from an internal, enterprise sender that is addressed to one or more external users and/or external devices that are not associated with the enterprise.

At step 215, message recreation computing platform 110 may generate an image representation of the third message. For example, at step 215, based on receiving the third message from the enterprise communications server (e.g., enterprise communications server 120), message recreation computing platform 110 may generate a third image representation of the third message received from the enterprise communications server (e.g., enterprise communications server 120). For instance, in generating the third image representation of the third message received from enterprise communications server 120, message recreation computing platform 110 may print and/or otherwise output the message body (e.g., message text, images, and/or other content) of the third message into an image file (which may, e.g., be generated and/or stored in a bitmap format, PNG format, or other graphics format). In generating this image file, message recreation computing platform 110 may, for instance, flatten text, images, and/or other layered content in the message body into a single layer of pixels that are represented only as graphical data (e.g., pixels) in the image file.

In some embodiments, generating the third image representation of the third message received from the enterprise communications server may include masking user account information included in the third message received from the enterprise communications server. For example, in generating the third image representation of the third message received from the enterprise communications server (e.g., enterprise communications server 120), message recreation computing platform 110 may mask user account information included in the third message received from the enterprise communications server (e.g., enterprise communications server 120). For instance, in masking the user account information included in the third message received from the enterprise communications server (e.g., enterprise communications server 120), message recreation computing platform 110 may selectively encrypt, redact, hide, and/or otherwise obscure one or more account numbers and/or other account-specific information, such that only the intended recipient(s) of the message are able to view this user account information. For instance, message recreation computing platform 110 may apply public-key cryptography, two-factor authentication, and/or other encryption and/or authentication techniques to mask this user account information.

At step 216, message recreation computing platform 110 may execute an OCR process (e.g., on the image representation of the third message, to convert alphanumeric characters in the image representation from graphical data back into text data). For example, at step 216, message recreation computing platform 110 may execute the OCR process on the third image representation of the third message. In addition, by executing the OCR process on the third image representation of the third message, message recreation computing platform 110 may produce a third recreated message. For instance, in executing the OCR process on the third image representation of the third message, message recreation computing platform 110 may apply an image-to-text algorithm to the image representation, so as to convert graphical content in the image representation back into machine-readable text content, thereby re-creating a clean version of the original message (which may, e.g., be free of any embedded content that might have been included in the original version of the message).

Figure 2E:
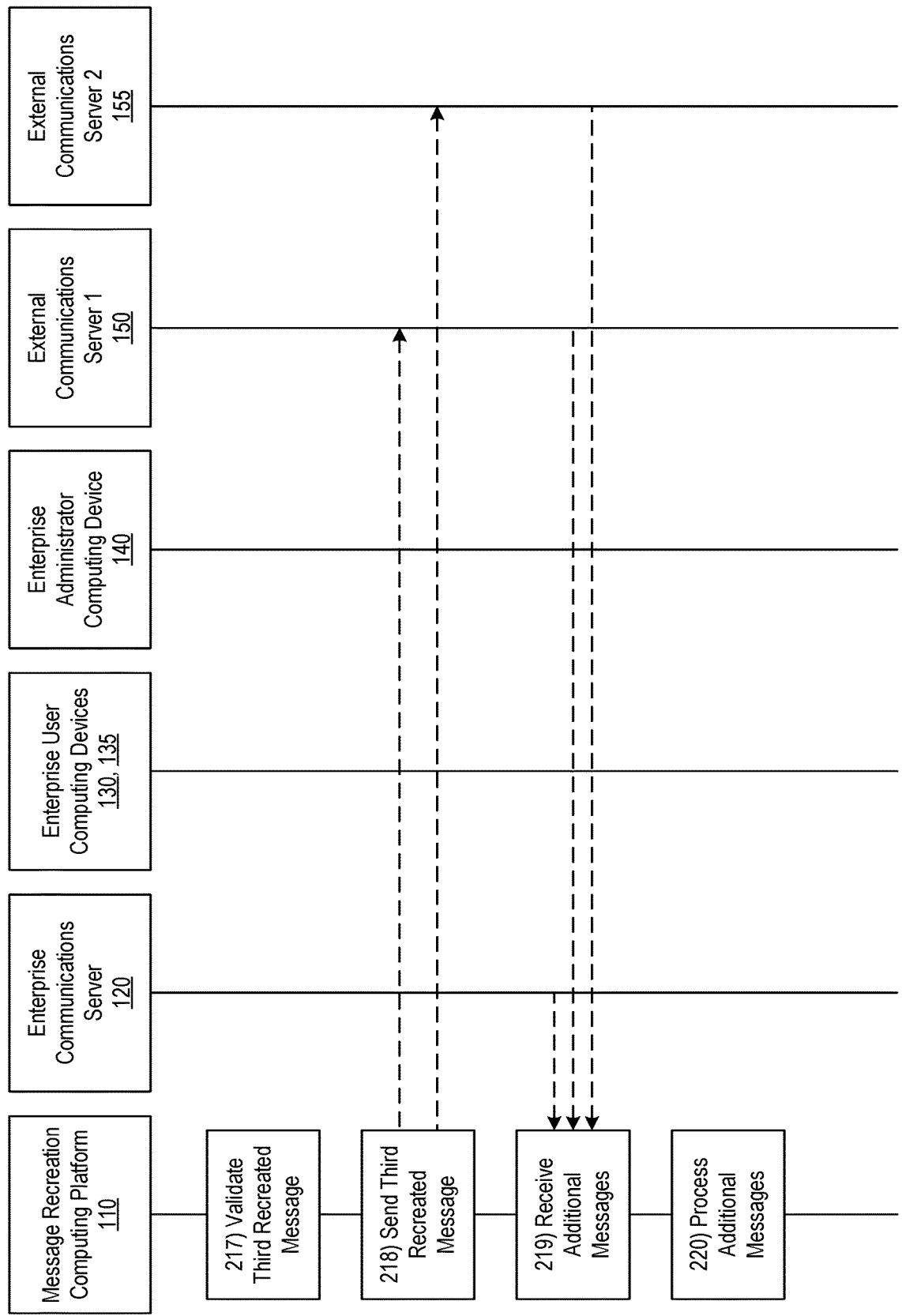

Referring to FIG. 2E, at step 217, message recreation computing platform 110 may validate the recreated message. For example, at step 217, message recreation computing platform 110 may validate contents of the third recreated message. For instance, in validating the contents of the third recreated message at step 217, message recreation computing platform 110 may determine that the message is clean (e.g., because message recreation computing platform 110 may scan the message and determine that the message does not contain proprietary information, confidential information, and/or other internal information that should not leave the enterprise network space) and therefore determine that the message is valid.

In some embodiments, validating the contents of the third recreated message may include evaluating text content of the third recreated message, one or more links associated with the third recreated message, or one or more attachments associated with the third recreated message. For example, in validating the contents of the third recreated message, message recreation computing platform 110 may evaluate text content of the third recreated message, one or more links associated with the third recreated message, or one or more attachments associated with the third recreated message. For instance, in validating the contents of the third recreated message, message recreation computing platform 110 may analyze message text of the third recreated message to scan for text associated with proprietary information, confidential information, and/or other internal information that should not leave the enterprise network space (e.g., personally identifying information, customer information, or the like). Additionally or alternatively, in validating the contents of the third recreated message, message recreation computing platform 110 may open links included in the third recreated message and scan pages corresponding to such links to determine whether such pages include proprietary information, confidential information, and/or other internal information that should not leave the enterprise network space (e.g., personally identifying information, customer information, or the like). Additionally or alternatively, in validating the contents of the third recreated message, message recreation computing platform 110 may analyze attachments to the message (e.g., attached files, macros, or the like) to scan for proprietary information, confidential information, and/or other internal information that should not leave the enterprise network space (e.g., personally identifying information, customer information, or the like).

Figure 4:
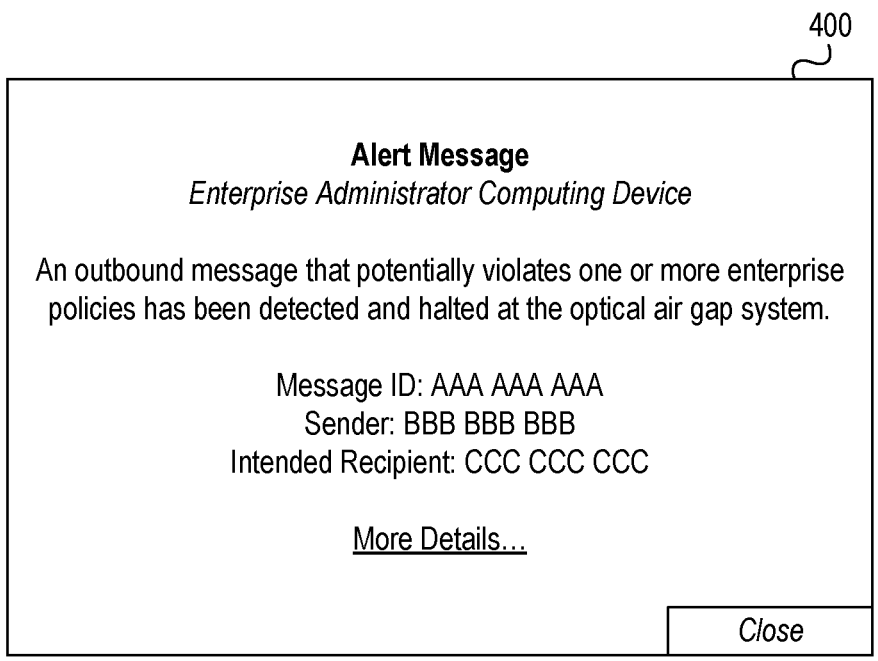

In this way, an optical air gap provided by message recreation computing platform 110 may be used to protect against insider threats and/or other data leaks (e.g., by applying the image generation and OCR steps described above to outbound messages). For instance, if message recreation computing platform 110 detects that an outbound message contains proprietary information, confidential information, and/or other internal information that should not leave the enterprise network space (e.g., personally identifying information, customer information, or the like) and thus determines the outbound message to be invalid, message recreation computing platform 110 may halt the message, generate one or more alerts, and/or execute other actions (e.g., similar to the actions described above in connection with the examples involving an invalid inbound message). For example, message recreation computing platform 110 may send an alert message to enterprise administrator computing device 140 indicating that an outbound message failed validation. In some instances, by sending such an alert message to enterprise administrator computing device 140, message recreation computing platform 110 may cause enterprise administrator computing device 140 to display and/or otherwise present one or more graphical user interfaces similar to graphical user interface 400, which is illustrated in FIG. 4. As seen in FIG. 4, graphical user interface 400 may include text and/or other content indicating that an invalid outbound message has been detected and halted (e.g., "An outbound message that potentially violates one or more enterprise policies has been detected and halted at the optical air gap system. Message ID: AAA AAA AAA; Sender: BBB BBB BBB; Intended Recipient: CCC CCC CCC; More Details . . . ").

At step 218, message recreation computing platform 110 may send the third recreated message to external communications server 150 and/or external communications server 155. For example, at step 218, based on validating the contents of the third recreated message, message recreation computing platform 110 may send, via the communication interface (e.g., communication interface 113), to one or more external communications servers (e.g., external communications server 150, external communications server 155), the third recreated message. In addition, by sending the third recreated message to the one or more external communications servers (e.g., external communications server 150, external communications server 155), message recreation computing platform 110 may cause the one or more external communications servers (e.g., external communications server 150, external communications server 155) to deliver the third recreated message to at least one external user computing device (e.g., external user computing device 160, external user computing device 165).

At step 219, message recreation computing platform 110 may receive one or more additional messages from enterprise communications server 120, external communications server 150, and/or external communications server 155. For example, at step 219, message recreation computing platform 110 may receive one or more additional outbound messages from enterprise communications server 120 and/or one or more additional inbound messages from external communications server 150 and/or external communications server 155.

At step 220, message recreation computing platform 110 may process the one or more additional messages received from enterprise communications server 120, external communications server 150, and/or external communications server 155. For example, at step 220, message recreation computing platform 110 may process the one or more additional messages received from enterprise communications server 120, external communications server 150, and/ or external communications server 155 by generating image representations, executing OCR processes to recreate the messages, validating the recreated messages, and/or performing other functions (e.g., similar to the functions that message recreation computing platform 110 may perform in processing the inbound messages and the outbound messages in the examples described above).

Figure 5:
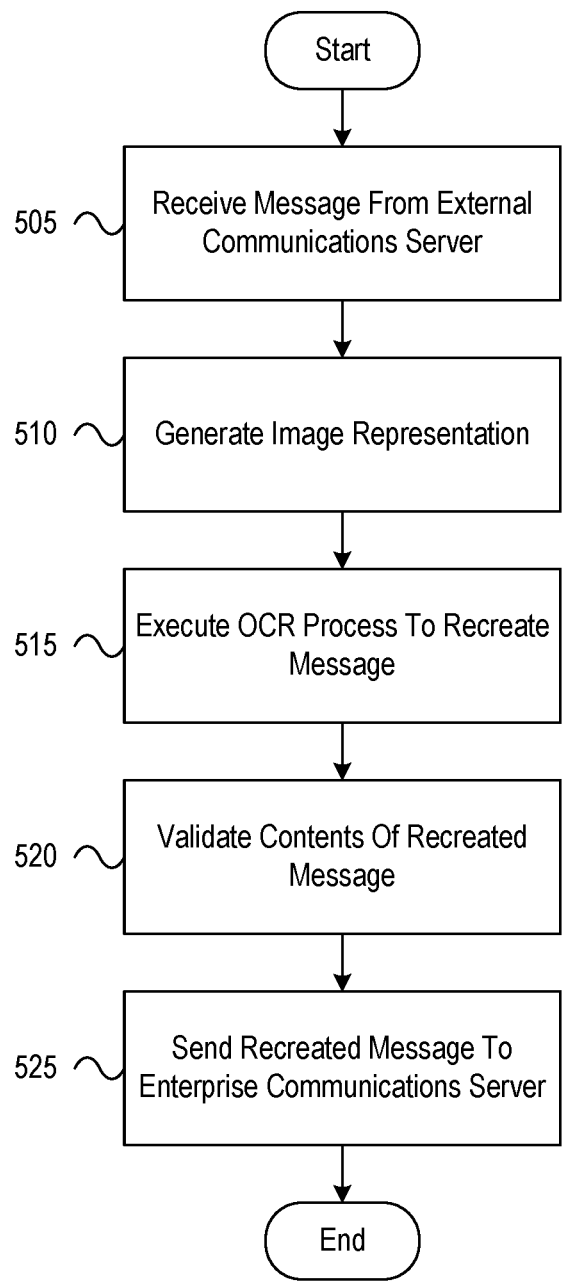
FIG. 5 depicts an illustrative method for protecting enterprise computing resources by implementing an optical air gap system in accordance with one or more example embodiments.

FIG. 5 depicts an illustrative method for protecting enterprise computing resources by implementing an optical air gap system in accordance with one or more example embodiments. Referring to FIG. 5, at step 505, a computing platform having at least one processor, a communication interface, and memory may receive, via the communication interface, from a first external communications server, a first message. At step 510, based on receiving the first message from the first external communications server, the computing platform may generate a first image representation of the first message received from the first external communications server. At step 515, the computing platform may execute an optical character recognition (OCR) process on the first image representation of the first message, and executing the OCR process on the first image representation of the first message may produce a first recreated message. At step 520, the computing platform may validate contents of the first recreated message. At step 525, based on validating the contents of the first recreated message, the computing platform may send, via the communication interface, to an enterprise communications server, the first recreated message, and sending the first recreated message to the enterprise communications server may cause the enterprise communications server to deliver the first recreated message to at least one enterprise user computing device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:

at least one processor;

a communication interface communicatively coupled to the at least one processor; and memory storing computer-readable instructions that, when executed by the at least one processor, cause the computing platform to:

receive, via the communication interface, from a first external communications server, a first message;

based on receiving the first message from the first external communications server, generate a first image representation of the first message received from the first external communications server;

execute an optical character recognition (OCR) process on the first image representation of the first message, wherein executing the OCR process on the first image representation of the first message produces a first recreated message;

validate contents of the first recreated message;

based on validating the contents of the first recreated message, send, via the communication interface, to an enterprise communications server, the first recreated message, wherein sending the first recreated message to the enterprise communications server causes the enterprise communications server to deliver the first recreated message to at least one enterprise user computing device;

receive, via the communication interface, from a second external communications server, a second message;

based on receiving the second message from the second external communications server, generate a second image representation of the second message received from the second external communications server;

execute the OCR process on the second image representation of the second message, wherein executing the OCR process on the second image representation of the second message produces a second recreated message;

attempt to validate contents of the second recreated message, wherein attempting to validate the contents of the second recreated message comprises failing to validate the contents of the second recreated message;

based on failing to validate the contents of the second recreated message, halt the second recreated message;

receive, via the communication interface, from the enterprise communications server, a third message;

based on receiving the third message from the enterprise communications server, generate a third image representation of the third message received from the enterprise communications server;

execute the OCR process on the third image representation of the third message, wherein executing the OCR process on the third image representation of the third message produces a third recreated message;

validate contents of the third recreated message; and based on validating the contents of the third recreated message, send, via the communication interface, to one or more external communications servers, the third recreated message, wherein sending the third recreated message to the one or more external communications servers causes the one or more external communications servers to deliver the third recreated message to at least one external user computing device.

2. The computing platform of claim 1, wherein validating the contents of the first recreated message comprises evaluating text content of the first recreated message, one or more links associated with the first recreated message, or one or more attachments associated with the first recreated message.

3. The computing platform of claim 1,
wherein the enterprise communications server and the at least one enterprise user computing device are connected to an enterprise network,
wherein the first external communications server is connected to a public network different from the enterprise network, and
wherein the computing platform comprises a first communications node for communicating with the enterprise network and a second communications node for communicating with the public network.

4. The computing platform of claim 3, wherein validating the contents of the first recreated message comprises validating the contents of the first recreated message in near real-time as the first message is received from the first external communications server.

5. The computing platform of claim 1, wherein attempting to validate the contents of the second recreated message comprises identifying that text content of the second recreated message is invalid.

6. The computing platform of claim 1, wherein attempting to validate the contents of the second recreated message comprises identifying that at least one link associated with the second recreated message is invalid.

7. The computing platform of claim 1, wherein attempting to validate the contents of the second recreated message comprises identifying that at least one attachment associated with the second recreated message is invalid.

8. The computing platform of claim 1, wherein the memory stores additional computer-readable instructions that, when executed by the at least one processor, cause the computing platform to:
in response to failing to validate the contents of the second recreated message, generate at least one alert message comprising information indicating that the second recreated message failed validation; and
send, via the communication interface, to an enterprise administrator computing device, the at least one alert message comprising the information indicating that the second recreated message failed validation.

9. The computing platform of claim 1, wherein the memory stores additional computer-readable instructions that, when executed by the at least one processor, cause the computing platform to:
in response to failing to validate the contents of the second recreated message, update at least one data record maintained by the computing platform to flag a sender of the second message received from the second external communications server as suspicious.

10. The computing platform of claim 1, wherein validating the contents of the third recreated message comprises evaluating text content of the third recreated message, one or more links associated with the third recreated message, or one or more attachments associated with the third recreated message.

11. The computing platform of claim 1, wherein generating the third image representation of the third message received from the enterprise communications server comprises masking user account information included in the third message received from the enterprise communications server.

12. A method, comprising:
at a computing platform comprising at least one processor, a communication interface, and memory:
receiving, by the at least one processor, via the communication interface, from a first external communications server, a first message;
based on receiving the first message from the first external communications server, generating, by the at least one processor, a first image representation of the first message received from the first external communications server;
executing, by the at least one processor, an optical character recognition (OCR) process on the first image representation of the first message, wherein executing the OCR process on the first image representation of the first message produces a first recreated message;
validating, by the at least one processor, contents of the first recreated message;
based on validating the contents of the first recreated message, sending, by the at least one processor, via the communication interface, to an enterprise communications server, the first recreated message, wherein sending the first recreated message to the enterprise communications server causes the enterprise communications server to deliver the first recreated message to at least one enterprise user computing device;

receiving, by the at least one processor and via the communication interface, from a second external communications server, a second message;

based on receiving the second message from the second external communications server, generating, by the at least one processor, a second image representation of the second message received from the second external communications server;

executing, by the at least one processor, the OCR process on the second image representation of the second message, wherein executing the OCR process on the second image representation of the second message produces a second recreated message;

attempting, by the at least one processor, to validate contents of the second recreated message, wherein attempting to validate the contents of the second recreated message comprises failing to validate the contents of the second recreated message;

based on failing to validate the contents of the second recreated message, halting, by the at least one processor, the second recreated message;

receiving, by the at least one processor and via the communication interface, from the enterprise communications server, a third message;

based on receiving the third message from the enterprise communications server, generating, by the at least one processor, a third image representation of the third message received from the enterprise communications server;

executing, by the at least one processor, the OCR process on the third image representation of the third message, wherein executing the OCR process on the third image representation of the third message produces a third recreated message;

validating, by the at least one processor, contents of the third recreated message; and based on validating the contents of the third recreated message, sending, by the at least one processor and via the communication interface, to one or more external communications servers, the third recreated message, wherein sending the third recreated message to the one or more external communications servers causes the one or more external communications servers to deliver the third recreated message to at least one external user computing device.

13. The method of claim 12, wherein validating the contents of the first recreated message comprises evaluating text content of the first recreated message, one or more links associated with the first recreated message, or one or more attachments associated with the first recreated message.

14. The method of claim 12,
wherein the enterprise communications server and the at least one enterprise user computing device are connected to an enterprise network,
wherein the first external communications server is connected to a public network different from the enterprise network, and
wherein the computing platform comprises a first communications node for communicating with the enterprise network and a second communications node for communicating with the public network.

15. The method of claim 14, wherein validating the contents of the first recreated message comprises validating the contents of the first recreated message in near real-time as the first message is received from the first external communications server.

16. The method of claim 12, wherein attempting to validate the contents of the second recreated message comprises identifying that text content of the second recreated message is invalid.

17. One or more non-transitory computer-readable media storing instructions that, when executed by a computing platform comprising at least one processor, a communication interface, and memory, cause the computing platform to:

receive, via the communication interface, from a first external communications server, a first message;

based on receiving the first message from the first external communications server, generate a first image representation of the first message received from the first external communications server;

execute an optical character recognition (OCR) process on the first image representation of the first message, wherein executing the OCR process on the first image representation of the first message produces a first recreated message;

validate contents of the first recreated message;

based on validating the contents of the first recreated message, send, via the communication interface, to an enterprise communications server, the first recreated message, wherein sending the first recreated message to the enterprise communications server causes the enterprise communications server to deliver the first recreated message to at least one enterprise user computing device;

receive, via the communication interface, from a second external communications server, a second message;

based on receiving the second message from the second external communications server, generate a second image representation of the second message received from the second external communications server;

execute the OCR process on the second image representation of the second message, wherein executing the OCR process on the second image representation of the second message produces a second recreated message;

attempt to validate contents of the second recreated message, wherein attempting to validate the contents of the second recreated message comprises failing to validate the contents of the second recreated message;

based on failing to validate the contents of the second recreated message, halt the second recreated message;

receive, via the communication interface, from the enterprise communications server, a third message;

based on receiving the third message from the enterprise communications server, generate a third image representation of the third message received from the enterprise communications server;

execute the OCR process on the third image representation of the third message, wherein executing the OCR process on the third image representation of the third message produces a third recreated message;

validate contents of the third recreated message; and based on validating the contents of the third recreated message, send, via the communication interface, to one or more external communications servers, the third recreated message, wherein sending the third recreated message to the one or more external communications servers causes the one or more external communications servers to deliver the third recreated message to at least one external user computing device.

* * * * *